United States Patent [19]
Hibbetts

[11] Patent Number: 5,110,143
[45] Date of Patent: May 5, 1992

[54] SEAL CARTRIDGE FOR USE IN IDLER ROLLERS

[75] Inventor: Bryon T. Hibbetts, Tupelo, Miss.

[73] Assignee: FMC Corporation, Chicago, Ill.

[21] Appl. No.: 621,175

[22] Filed: Nov. 30, 1990

[51] Int. Cl.$^5$ .............................................. F16J 15/32
[52] U.S. Cl. ............................................ 277/47; 277/35; 277/50; 277/153; 384/487
[58] Field of Search ................ 277/47, 35, 38, 44, 277/45, 50, 152, 153, 48, 49; 384/484, 487, 147, 148, 151

[56] References Cited

U.S. PATENT DOCUMENTS

| | | | |
|---|---|---|---|
| 1,849,404 | 3/1932 | Leonard, Jr. | |
| 2,055,917 | 9/1936 | Victor et al. | 277/50 |
| 3,025,113 | 3/1962 | Helwig | 384/148 |
| 3,510,138 | 5/1970 | Bowen et al. | 277/35 |
| 3,771,799 | 11/1973 | Sekulich et al. | 277/47 |
| 3,841,723 | 10/1974 | Kelso | 384/487 |
| 4,359,228 | 11/1982 | Cather. | |
| 4,428,630 | 1/1984 | Folger et al. | 277/47 |
| 4,437,821 | 3/1984 | Ogawa | 277/152 |
| 4,695,062 | 9/1987 | Dreschmann et al. | 277/50 |
| 4,810,233 | 3/1989 | Crane, Jr. et al. | 277/50 |

FOREIGN PATENT DOCUMENTS 0867189 7/1949 Fed. Rep. of Germany ........ 277/47

Primary Examiner—William A. Cuchlinski, Jr.
Assistant Examiner—Daniel G. DePumpo
Attorney, Agent, or Firm—Douglas W. Rudy; Richard B. Megley

[57] ABSTRACT

A bearing seal having multiple elements including a pair of contact seals, one of which is a fiber seal and a second of which is an elastomeric seal, is provided for use with a bushing having an inclined step which, in conjunction with a seal locator having an upturned flange and a spacer, forms a cavity to accommodate a projecting lip of the elastomeric seal.

4 Claims, 1 Drawing Sheet

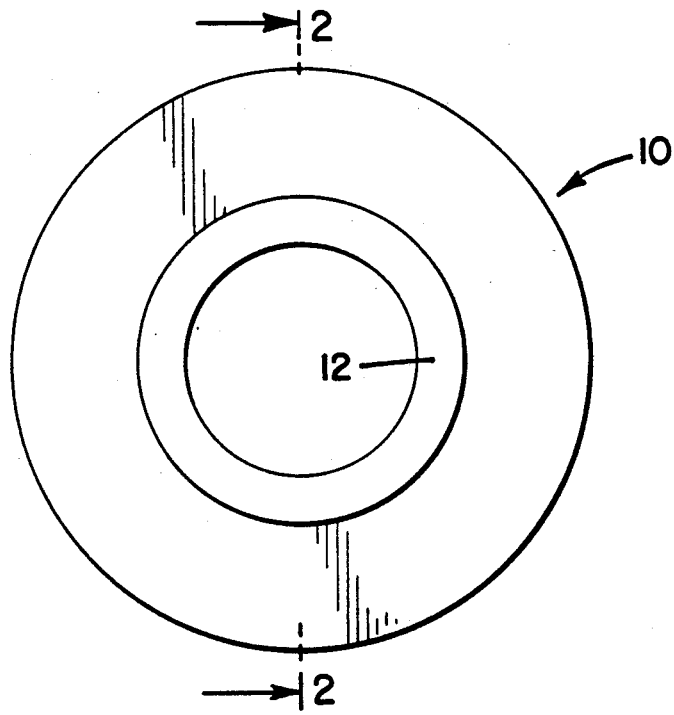
FIG_1
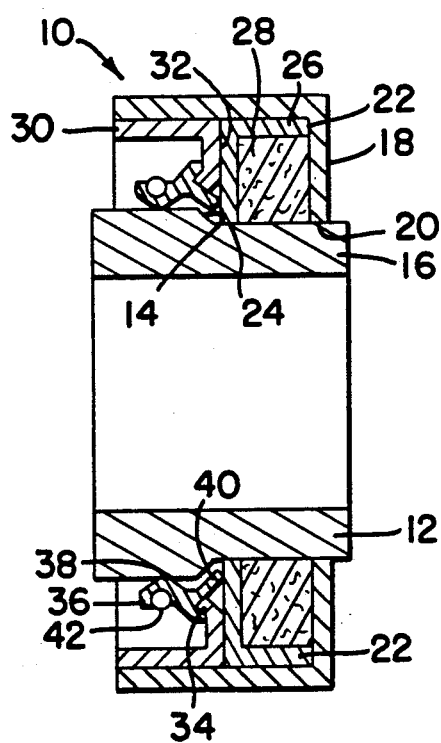
FIG_2
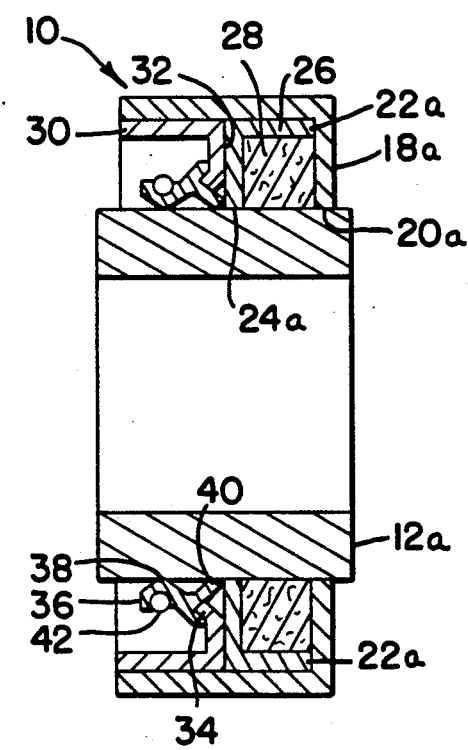
FIG_3

SEAL CARTRIDGE FOR USE IN IDLER ROLLERS

BACKGROUND OF THE INVENTION

This invention has to do with a seal for use in protecting a bearing in an idler roller. Idler rollers are commonly used in bulk material handling systems wherein a conveyor belt is supported by a plurality of such idler rollers in a well known manner.

The bearing seal disclosed herein is normally carried on an axle shaft with the outside diameter of the seal captured inside a cavity of a tube or end cap which supports the roller surface proper. Usually the axle/tube combination includes a bearing at each end of the roller structure and a seal, located outboard of the bearings, is also provided at each end of the roller assembly.

There are many prior art bearing seals, including several different types of seals offered for sale by FMC Corporation, the assignee of this invention. They include contact seals, labyrinth seals and various types of packing seals—as well as combination seals that include both contact seals and labyrinth seals.

A problem with seals however is that in a slurry or high water exposure environment such seals have a difficult time keeping water from passing through the seal. The instant invention is directed to addressing this problem and is an approach that may prove effective in certain environments.

SUMMARY OF THE INVENTION

The seal provided herein is comprised of seven elements, four of which are support or locating elements and two of which are contact seals. The contact seals include a fiber, preferably a felt, ring of rectangular cross section and an elastomeric inner seal.

A housing will have an outer diameter that will be a press fit into the tube of the idler roller while the aperture of the seal will accommodate a bushing that would be placed over the axle of the idler roller.

BRIEF DESCRIPTION OF THE DRAWING FIGURES

The invention is illustrated by drawing figures including:

FIG. 1 showing an end view of a bearing seal including a bushing for accommodating an axle shaft.

FIG. 2 is a cross sectional view taken through plane 2—2 of FIG. 1.

FIG. 3 is a cross sectional view of an alternative embodiment of the invention.

DETAILED DESCRIPTION OF THE INVENTION

The invention can be clearly understood by an examination of the drawing figures. In FIG. 1 the bearing seal, generally 10 is shown surrounding a bushing 12. Generally, the bearing seal and the bushing will be provided as a single assembly.

The bushing, as shown in FIG. 2, includes a step 14 where the outside diameter of the bushing becomes greater than the diameter at the outboard end 16 of the bushing.

An alternative embodiment, as shown in FIG. 3 is similar to the preferred embodiment shown in FIG. 2 except that the bushing does not include a "step" and the different outside diameters. The outside diameter of the alternative bushing is of a constant diameter.

Returning to the preferred embodiment shown in FIG. 2, a seal housing 18 is a circumferentially disposed cup-like member having an aperture 20 therein to accommodate the outboard end diameter of the bushing. The seal housing 18 is generally "L-shaped" in cross section as shown in FIG. 2.

Inside the seal housing 18 are the other components of the seal generally 10, including a spacer 22 which has an "L-shaped" cross sectional shape and an internal aperture 24 large enough to fit over the end of the bushing 12 at the outboard end 16 thereof. The spacer 22 includes a leg 26, which may be a continuous or interrupted surface, which, when abutted against the inner surface of the seal housing 18 defines a cavity into which a contact seal 28 is contained.

The contact seal 28 may be a felt seal having an inside diameter substantially the same as the diameter of the end of the bushing 16 so that the fit of the felt seal is close on the bushing. The outer circumference of the circular felt seal, which, as stated above is generally rectangular in cross section, is substantially the same as the inside diameter of the spacer 22 inside of the surface of the leg 26.

Relatively inboard of the spacer 22 is a seal locator 30 having a surface 32 which abuts the spacer 22. The seal locator 30 includes an upturned flange 34, the flanged being turned inwardly with respect to the end of the bushing 16, which provides a circumferential aperture greater than the diameter of the larger diameter section of the bushing. This aperture accommodates an inner seal 36 having a contact surface 38 which contacts the larger diameter of the bushing. The inner seal 36 also includes an inwardly and downwardly extending lip 40 which projects beyond the end of the flange 34 and into the cavity formed between the step 14 on the bushing and the spacer 22.

In the alternative embodiment shown in FIG. 3 the downwardly extending lip may contact the surface of the bushing provided that it is long enough to do so. Alternative lip lengths are contemplated.

It should be pointed out that all the elements of the bearing seal are generally circumferential pieces as is well known in the art. Both the contact seal 28 and the inner seal 36 are the only elements in contact with the bushing and are in rotatable, slidable contact therewith. The seal housing is a press fit into a host tube or end cap (not shown but well known in the art) and is fixed preventing rotation of the seal housing by its friction contact with the tube or end cap. The bushing would normally be a close fit, possibly even a press fit on the axle shaft (not shown). The spacer 22 and the seal locator 30 are likewise fixed to the seal housing and don't move relative to the seal housing.

Thus it can be seen that there has been provided a bearing seal designed for use with an idler roll that will effectively seal an inboard bearing from the invasion of foreign material. The attached claims attempt to broadly claim the instant invention however nuances of design not specifically claimed are deemed to within the broad scope of the claims.

What is claimed is:

1. A rotary seal for use in a conveyor roller having an axle and a roll surface and a bearing supporting said roll surface for rotary motion on said axle, said rotary seal comprising:

a seal housing having an aperture therein;
a spacer carried inside said seal housing;

a seal locator having an upturned flange carried inside said seal housing inboard from and adjacent to said spacer;

a contact seal carried in said seal housing, said contact seal in contact with an inner surface of said seal housing and said spacer;

an inner seal carried by said seal locator, said inner seal having a lip portion in contact with said spacer and an inwardly and downwardly projecting lip projecting beyond the end of said upturned flange;

a bushing having a first diameter and a second diameter greater than said first diameter relatively inboard from said first diameter, said first diameter separated from said second diameter by an inclined step inboard of said spacer when said bushing is located in said aperture of said seal housing, said inclined step and said spacer forming a cavity to accommodate said inwardly and downwardly projecting lip.

2. The invention in accordance with claim 1 wherein said contact seal and said inner seal are each in contact with the outer circumferential surface of said bushing.

3. The invention in accordance with claim 2 wherein said inner seal includes a spring urging said inner seal into contact with said bushing surface.

4. The invention in accordance with claim 2 wherein said contact seal is a felt seal.

* * * * *